(12) United States Patent
Back, Sr.

(10) Patent No.: US 7,754,132 B1
(45) Date of Patent: Jul. 13, 2010

(54) METHOD OF MAKING A SPOOL SEAL HAVING A SMOOTH SEALING SURFACE

(76) Inventor: Forest H. Back, Sr., 6878 Yankee St., Dayton, OH (US) 45459

( * ) Notice: Subject to any disclaimer, the term of this patent is extended or adjusted under 35 U.S.C. 154(b) by 89 days.

(21) Appl. No.: 11/517,851

(22) Filed: Sep. 8, 2006

Related U.S. Application Data

(60) Provisional application No. 60/732,947, filed on Nov. 3, 2005.

(51) Int. Cl.
*B29C 39/10* (2006.01)
(52) U.S. Cl. .................. 264/299; 264/154; 264/259; 264/267; 264/325; 264/328.1; 264/DIG. 67; 425/577; 425/591; 425/387.1; 425/414; 425/466; 425/DIG. 47
(58) Field of Classification Search .......... 425/97, 425/165, 556, 587, 589, 591, 594, 422, 450.1, 425/DIG. 44, 47, 168, DIG. 47, 546, 577, 425/387.1, 394, 403, 412, 414, 415, 416, 425/423, 441, 436 RM, 466, 467, DIG. 42; 264/154, 155, 232, 249, 250, 262, 267, 318, 264/334, 328.9, 328.2, 328.3, 238, 259, 266, 264/299, 320, 325, 328.1, DIG. 67
See application file for complete search history.

(56) References Cited

U.S. PATENT DOCUMENTS

| | | | | |
|---|---|---|---|---|
| 2,170,919 A | * | 8/1939 | Thener | 264/232 |
| 2,473,284 A | * | 6/1949 | Knaggs | 425/546 |
| 2,497,226 A | * | 2/1950 | McNeill | 156/125 |
| 2,893,058 A | * | 7/1959 | Wurtz et al. | 425/35 |
| 2,949,635 A | * | 8/1960 | Chiero | 425/128 |
| 2,982,997 A | * | 5/1961 | Peickii et al. | 425/193 |
| 2,982,999 A | * | 5/1961 | Stewart | 29/527.1 |
| 3,004,298 A | * | 10/1961 | Haynie | 29/527.4 |
| 3,032,824 A | * | 5/1962 | Proud | 264/159 |
| 3,162,456 A | * | 12/1964 | Williams | 277/551 |
| 3,193,884 A | * | 7/1965 | Haynie et al. | 425/400 |
| 3,270,373 A | * | 9/1966 | Thornton et al. | 425/128 |
| 3,475,790 A | * | 11/1969 | Bush et al. | 425/511 |
| 3,603,602 A | | 9/1971 | Padula | |
| 3,733,155 A | * | 5/1973 | Burke | 425/128 |
| 3,754,846 A | * | 8/1973 | Choate | 425/125 |
| 3,897,957 A | | 8/1975 | Warner | |
| 3,899,567 A | * | 8/1975 | Gorman | 264/318 |
| 3,985,487 A | * | 10/1976 | Clark | 425/304 |

(Continued)

FOREIGN PATENT DOCUMENTS

JP 57116629 A * 7/1982

(Continued)

*Primary Examiner*—Philip C Tucker
*Assistant Examiner*—Dimple N Bodawala
(74) *Attorney, Agent, or Firm*—Dinsmore & Shohl LLP

(57) ABSTRACT

A method of making a spool seal having a smooth sealing surface is provided which utilizes a mold including separable first and second mold halves which join when closed to form a parting line which is positioned away from the area of the mold which forms the inner and outer diameter surfaces of the spool seal. A moldable material is introduced into the cavity defined by the closed mold halves and cured such that the resulting inner and outer diameter surfaces of the molded spool seal are free of parting lines.

6 Claims, 2 Drawing Sheets

U.S. PATENT DOCUMENTS

| | | | | |
|---|---|---|---|---|
| 3,988,091 | A * | 10/1976 | Reichenbach | 425/125 |
| 4,021,524 | A * | 5/1977 | Grimsley | 264/242 |
| 4,043,727 | A * | 8/1977 | Henzl | 425/578 |
| 4,580,962 | A * | 4/1986 | Haas | 425/111 |
| 4,672,733 | A * | 6/1987 | Schmitt | 29/511 |
| 4,689,190 | A * | 8/1987 | Peisker et al. | 264/159 |
| 4,723,350 | A * | 2/1988 | Kobayashi et al. | 29/417 |
| 4,823,970 | A * | 4/1989 | Young | 215/329 |
| 4,824,620 | A * | 4/1989 | Casa et al. | 264/40.1 |
| 4,867,926 | A * | 9/1989 | Matsushima | 264/154 |
| 4,986,944 | A * | 1/1991 | Bertschi | 264/40.5 |
| 5,063,004 | A * | 11/1991 | Leupold | 264/427 |
| 5,164,136 | A * | 11/1992 | Comert et al. | 264/232 |
| 5,190,078 | A | 3/1993 | Stoll et al. | |
| 5,595,697 | A * | 1/1997 | Wada et al. | 264/135 |
| 5,711,535 | A | 1/1998 | Stoll et al. | |
| 6,146,125 | A | 11/2000 | DiSimone | |
| 6,394,779 | B1 * | 5/2002 | Komazawa et al. | 425/123 |
| 6,461,557 | B1 * | 10/2002 | Boast et al. | 264/257 |
| 6,524,512 | B1 | 2/2003 | Mintgen et al. | |
| 6,662,977 | B2 | 12/2003 | Gerber et al. | |
| 6,887,063 | B2 * | 5/2005 | Moore et al. | 425/215 |
| 6,939,500 | B2 | 9/2005 | Bernard | |
| 2002/0105111 | A1 * | 8/2002 | Grabel et al. | 264/237 |
| 2002/0144766 | A1 * | 10/2002 | Moore et al. | 156/118 |

FOREIGN PATENT DOCUMENTS

| | | | |
|---|---|---|---|
| JP | 59111825 A * | 6/1984 | |
| JP | 60161119 A * | 8/1985 | |
| JP | 04312802 A * | 11/1992 | |

* cited by examiner

METHOD OF MAKING A SPOOL SEAL HAVING A SMOOTH SEALING SURFACE

CROSS REFERENCE TO RELATED APPLICATIONS

This application claims the benefit of U.S. Provisional Application No. 60/732,947, entitled METHOD OF MAKING A SPOOL SEAL HAVING A SMOOTH SEALING SURFACE filed Nov. 3, 2005. The entire contents of said application are hereby incorporated by reference.

BACKGROUND OF THE INVENTION

The present invention relates to a method of making spool seals for use on a spool in a solenoid valve assembly, and more particularly, to an improved molding process which allows the spool seals to be formed without die parting lines on the surfaces which are used for sealing.

Spool seals are known in the art for providing a seal on spools used in solenoid valves. The spool seal is typically comprised of rubber which has been formed into an annular ring shape by a molding process, such as injection molding. Such spool seals are typically mounted at intervals along the length of the valve spool to prevent internal and external air leakage from one valve chamber to another.

Most spool seals currently in use are formed by a molding process utilizing a two-piece mold, where the parting line of the closed mold halves is positioned at the cross section of the seal where the inner and outer diameter surfaces are formed. As a result, a rib-like projection is present at the inner and outer diameter surfaces of the molded seals. This projection is commonly referred to as a parting line. This parting line can result in a poor sealing surface when the spool seal comes into contact with the spool valve and/or valve body, since the inner and outer diameter sealing surfaces of the spool seal are not smooth.

While the parting line can be removed from the molded seal by post-molding processes such as machining, grinding, or cryogenic deflashing, such additional steps add to the expense of producing the spool seal. It would be desirable to be able to produce a spool seal using a conventional molding process without the formation of parting lines on the sealing surfaces and without requiring the use of special molding or post-molding equipment.

Accordingly, there is a need in the art for an improved method of forming spool seals which eliminates parting lines at the sealing surfaces of the seal.

SUMMARY OF THE INVENTION

The present invention meets that need by providing an improved molding process and mold for forming spool seals which eliminate parting lines at the inner and outer diameter surfaces of the seals such that a smooth sealing surface is provided when the seals are positioned on a spool valve.

According to one aspect of the present invention, a method of making a spool seal having a smooth sealing surface is provided. By "smooth sealing surface," it is meant that the inner and outer diameter surfaces of the seal which come into contact with spool valve and/or valve body sealing surfaces are smooth and free of parting lines.

The method includes providing a mold comprising separable first and second mold halves which join when closed to form a parting line and a cavity therein. The first mold half is adapted to form the outer diameter of the spool seal to be molded therein, and the second mold half is adapted to form the inner diameter of the spool seal to be molded therein.

The first and second mold halves are closed such that the parting line formed by the closed mold halves is positioned away from the area of the mold which forms the inner and outer diameter surfaces of the seal to be molded. A moldable material is then introduced into the cavity defined by the closed mold halves and is cured. The moldable material is preferably introduced into the mold by injection molding, transfer molding, or compression molding. Preferably, the moldable material is comprised of rubber or plastic.

According to another aspect of the present invention, a mold is provided for forming a spool seal having a smooth sealing surface which comprises a two-part separable mold including a first mold half and a second mold half. The first mold half includes a cavity which forms the outer diameter of the spool seal to be molded therein, and the second mold half includes a core portion which forms the inner diameter of the spool seal to be molded therein. The first and second mold halves are adapted to be joined when closed to form a parting line and a cavity therein, where the parting line is positioned away from the area of the mold which forms the inner and outer diameter surfaces of the spool seal. Preferably, the parting line of the closed mold halves is formed at an area which forms the top perimeter of the spool seal.

Accordingly, the spool seal formed by the method of the present invention includes a parting line around the perimeter of the top surface of the seal. The location of the parting line does not affect the sealing ability of the seal as the inner and outer diameter sealing surfaces are free of parting lines.

Accordingly, it is a feature of embodiments of the present invention to provide a method of making a spool seal having a smooth sealing surface. Other features and advantages of the invention will be apparent from the following description and the accompanying drawings.

DETAILED DESCRIPTION OF THE PREFERRED EMBODIMENTS

Figure 1:
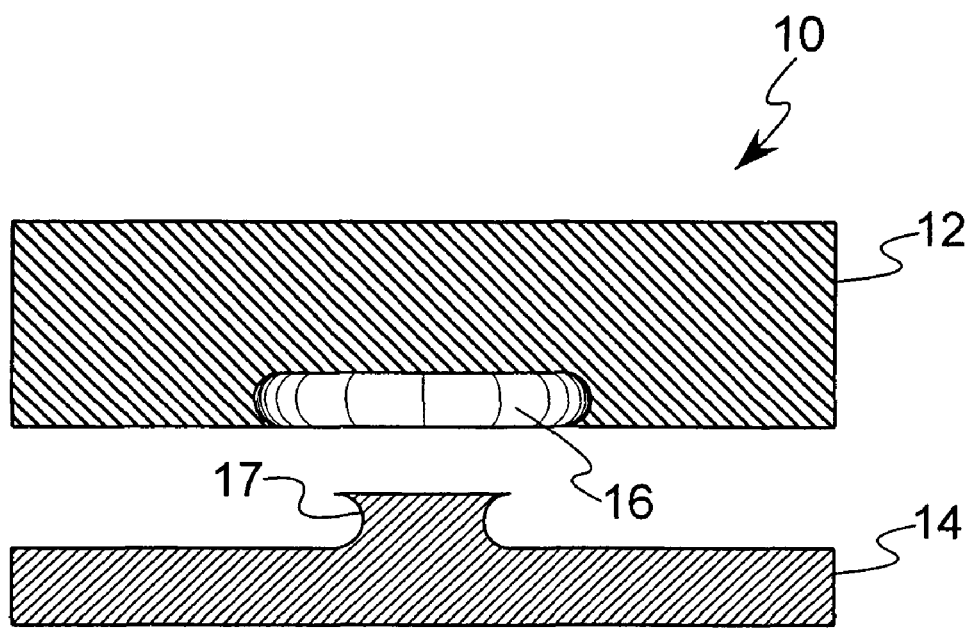
FIG. 1 is a sectional view of the mold used in the method of the present invention, shown in an open configuration.

Referring now to FIG. 1, a mold 10 for use in forming the spool seal of the present invention is illustrated. The mold is preferably used in conjunction with an injection molding system, a transfer molding system, or a compression molding system. However, it should be appreciated that the mold may be used with any molding system which is capable of forming the desired spool seal having a smooth sealing surface. As shown in FIG. 1, the mold includes first and second separable mold halves 12 and 14. The first mold half 12 preferably comprises a mold cavity portion 16 and the second mold half 14 preferably comprises a mold core portion 17. Both mold halves may be movable, or one of the mold halves may be stationary and the other mold half may be movable. The mold halves may be opened and closed by conventional means.

Figure 2:
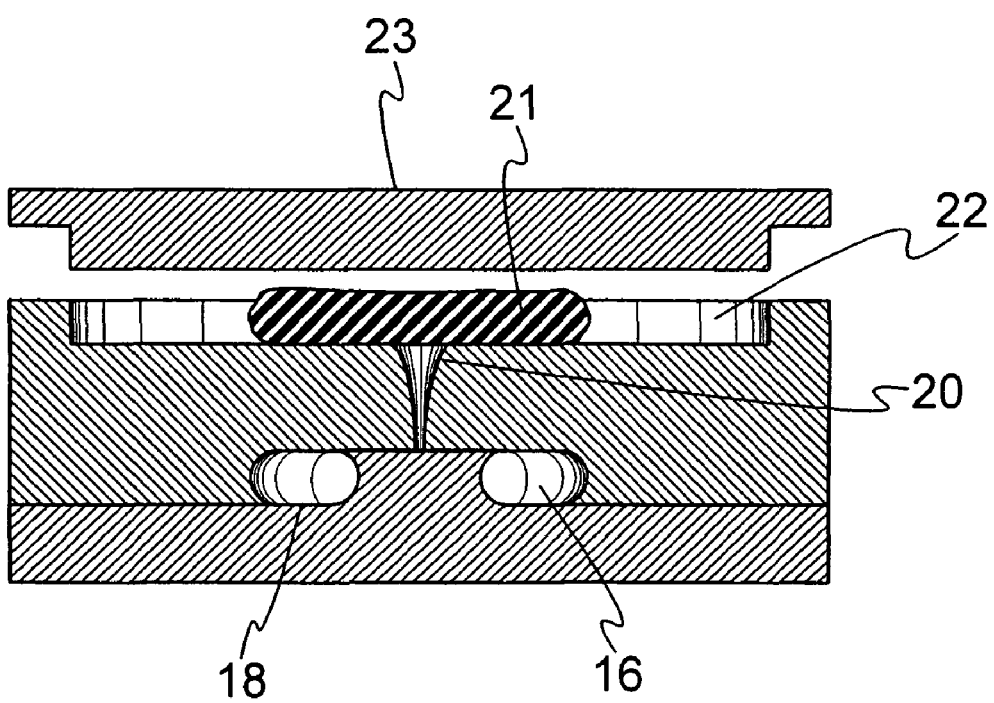
FIG. 2 is a sectional view of the mold of FIG. 1 shown in a closed configuration.

FIG. 2 illustrates the mold in a closed position where the mold halves define a mold cavity 16 in the annular ring shape of the spool seal to be molded. As shown, the parting line 18 which results when the mold is closed is positioned at the top (or bottom) surface of the seal to be molded, i.e., away from the middle cross-section of the inner and outer diameter surfaces. A sprue hole 20 is preferably provided in the mold for introducing moldable material into the cavity 16 of the closed mold halves.

The spool seal is preferably formed by a conventional transfer molding process as shown in FIG. 2 in which in which a block of uncured moldable material 21 such as rubber is placed in a "pot" 22 in a cavity above the mold and then forced into the mold using a plunger or punch 23, followed by the application of heat and pressure. Examples of suitable rubber materials which may be used to form the spool seal of the present invention include, but are not limited to, butadiene-acrylonitrile copolymers and carbon-modified butadiene-acrylonitrile copolymers such as Nipol 1052 and Nipol 1072, available from Zeon Chemicals. Other suitable rubbers include polyester millable urethanes such as Vibrathane 5004 from TSE Industries, and fluoroelastomer dipolymers such as Viton A-401C from DuPont Dow. Both natural and synthetic rubbers may be used for the seal of the present invention.

After introduction of the rubber material, the mold is held in place until the rubber cures. The plunger is then raised up and the mold is opened for removal of the spool seal.

Alternatively, the spool seal may be formed by a conventional injection molding process (not shown) in which an uncured rubber or plastic material is fed into a machine in the form of a strip which is warmed and then forced into the mold using controlled pressure, temperature and injection speeds. After injection, the rubber cures in the mold and the mold halves are then separated and the spool seal is removed.

The seal may also be formed by a conventional compression molding process (not shown) in which a pre-mixed, pre-sized mass of uncured rubber is placed in the mold cavity, and then heated and held under hydraulic pressure until the rubber is cured. The mold halves are then opened and the spool seal is removed.

Figure 3:
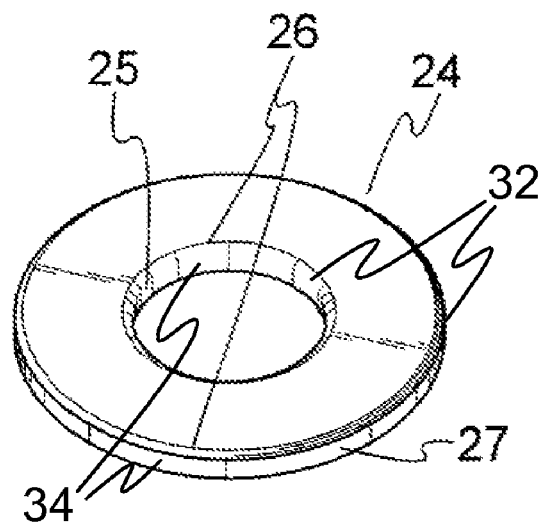
FIG. 3 is a perspective view of a spool seal formed in accordance with the method of the present invention.
Figure 4:
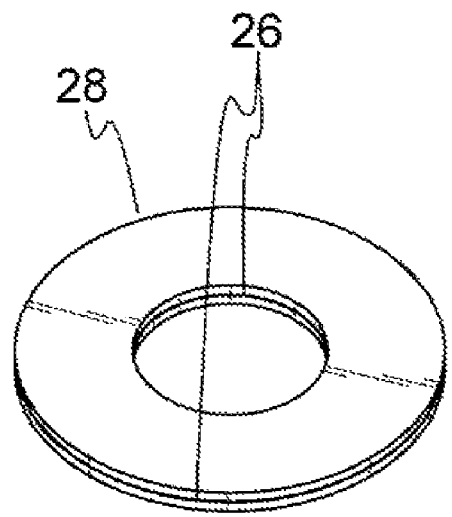
FIG. 4 is a perspective view of a prior art spool seal formed with parting lines around the inner and outer diameter surfaces.
Figure 5:
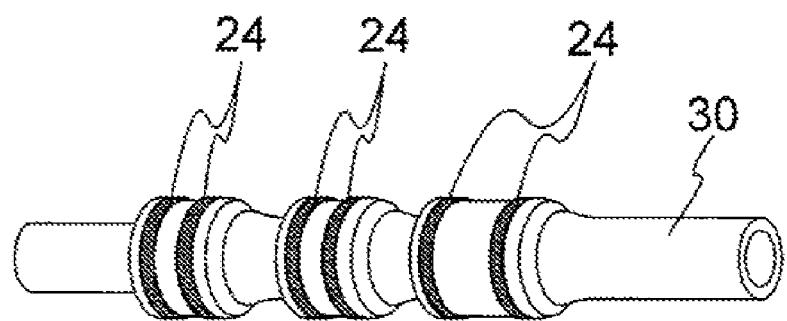
FIG. 5 is a perspective view of the spool seal of the present invention mounted on a spool.

A spool seal 24 formed by the mold and molding process of the present invention is illustrated in FIG. 3. The spool seal has an annular ring shape, a flat to surface, a flat bottom surface, and includes inner and outer diameter surfaces 25 and 27 which are adapted to come into contact with and seal the surfaces of a valve spool as shown in FIG. 5 as described below. As shown in FIG. 3, the parting lines 26 formed on the spool seal are formed on the perimeter of the top surface of the seal away from the middle cross-section 32 of the inner and outer diameter sealing surfaces 25 and 27 such that a smooth sealing surface 34 is provided. This is in contrast to prior spool seals such as spool seal 28 shown in FIG. 4 in which the parting lines 26 are formed on the inner and outer diameter surfaces.

As shown in FIG. 5, the spool seal 24 formed by the method of the present invention may be mounted along the length of a valve spool 30 to provide a sealing feature in a solenoid valve assembly. The valve spool including the spool seal can be placed in a valve body (not shown) such that the outer diameter of the seal is sealed against the valve body surface.

It should be appreciated that the number of spool seals used on a spool may vary. Because the inner and outer diameter surfaces of the seal are smooth, an improved seal results. The spool seal may be used in conjunction with pneumatic valves as well as fluid valves.

Having described the invention in detail and by reference to preferred embodiments thereof, it will be apparent that modifications and variations are possible without departing from the scope of the invention.

What is claimed is:

1. A method of making a spool seal having a top surface, a bottom surface, an inner diameter surface, an outer diameter surface, and a middle cross-section at said inner and outer diameter surfaces; said method comprising:

providing a mold comprising separable first and second mold halves which join when closed to form a parting line and a cavity therein; wherein said first mold half is adapted to form the outer diameter surface of the spool seal to be molded therein and said second mold half is adapted to form the inner diameter surface of the spool seal to be molded therein;

closing said first and second mold halves such that the parting line formed by said closed mold halves is positioned at the top or bottom surface of said spool seal to be molded therein;

introducing a moldable material into the cavity defined by the closed mold halves; and curing said moldable material to form said spool seal; wherein said molded spool seal has an annular ring shape, a smooth sealing surface at said middle cross-section of said inner and outer diameter surfaces, a flat top surface, and a flat bottom surface.

2. The method of claim 1 including opening said first and second mold halves and removing said cured spool seal from said mold.

3. The method of claim 1 wherein said moldable material comprises rubber or plastic.

4. The method of claim 1 wherein said moldable material is introduced into said mold by injection molding, transfer molding, or compression molding.

5. A spool seal formed by the method of claim 1 wherein the inner and outer diameter surfaces of said seal are free of a parting line.

6. A spool seal mold for forming a spool seal having a top surface, a bottom surface, an inner diameter surface, an outer diameter surface, and a middle cross-section at said inner and outer diameter surfaces; said mold comprising:

a first mold half and a second mold half, said first mold half including a cavity which forms the outer diameter surface of a spool seal to be molded therein and said second mold half including a core portion which forms the inner diameter surface of a spool seal to be molded therein; said first and second mold halves adapted to be joined when closed to form a parting line and a cavity therein; wherein said parting line is positioned at the top or bottom surface of said spool seal to be molded therein such that the resulting molded spool seal has an annular ring shape, a flat top surface, a flat bottom surface, and a smooth sealing surface at said middle cross-section of said inner and outer diameter surfaces.

* * * * *